United States Patent
Horovitz et al.

(10) Patent No.: US 7,535,195 B1
(45) Date of Patent: May 19, 2009

(54) BATTERY CHARGER THAT EMPLOYS CURRENT SHARING TO SIMULTANEOUSLY POWER AN APPLICATION AND CHARGE A BATTERY

(75) Inventors: Neal Lane Horovitz, Los Altos, CA (US); Luan Vu, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 350 days.

(21) Appl. No.: 11/212,171

(22) Filed: Aug. 25, 2005

(51) Int. Cl.
*H01M 6/50* (2006.01)
(52) U.S. Cl. .................. 320/106; 320/141; 320/145
(58) Field of Classification Search ............ 320/141, 320/145, 106
See application file for complete search history.

(56) References Cited

U.S. PATENT DOCUMENTS

| | | | |
|---|---|---|---|
| 5,903,764 A | * | 5/1999 | Shyr et al. .............. 713/300 |
| 6,184,660 B1 | * | 2/2001 | Hatular ................... 320/141 |
| 6,274,950 B1 | * | 8/2001 | Gottlieb et al. .......... 307/66 |
| 6,509,717 B2 | | 1/2003 | Lee |
| 6,629,182 B1 | | 9/2003 | Mizoguchi et al. |
| 6,664,764 B1 | * | 12/2003 | Odaohhara .............. 320/132 |
| 6,861,823 B2 | | 3/2005 | Bucur |
| 2006/0145665 A1 | * | 7/2006 | Zemke et al. ........... 320/133 |

OTHER PUBLICATIONS

Linear Technology Datasheet (2004) "LTC4055—USB Power Controller and Li-Ion Linear Charger," pp. 1-24.

* cited by examiner

*Primary Examiner*—Akm E Ullah
*Assistant Examiner*—Nguyen Tran
(74) *Attorney, Agent, or Firm*—Darby & Darby P.C.; John Tolomei

(57) ABSTRACT

Circuitry for powering a load and charging of a battery from a power source by a smart power supply is provided. The smart power supply controls the maximum current for battery charging based in part upon variables such as the maximum rate of charge of the battery and maximum source current. The smart power supply is thus capable of providing the power requested by the load, and use the remaining power for battery charging.

18 Claims, 5 Drawing Sheets

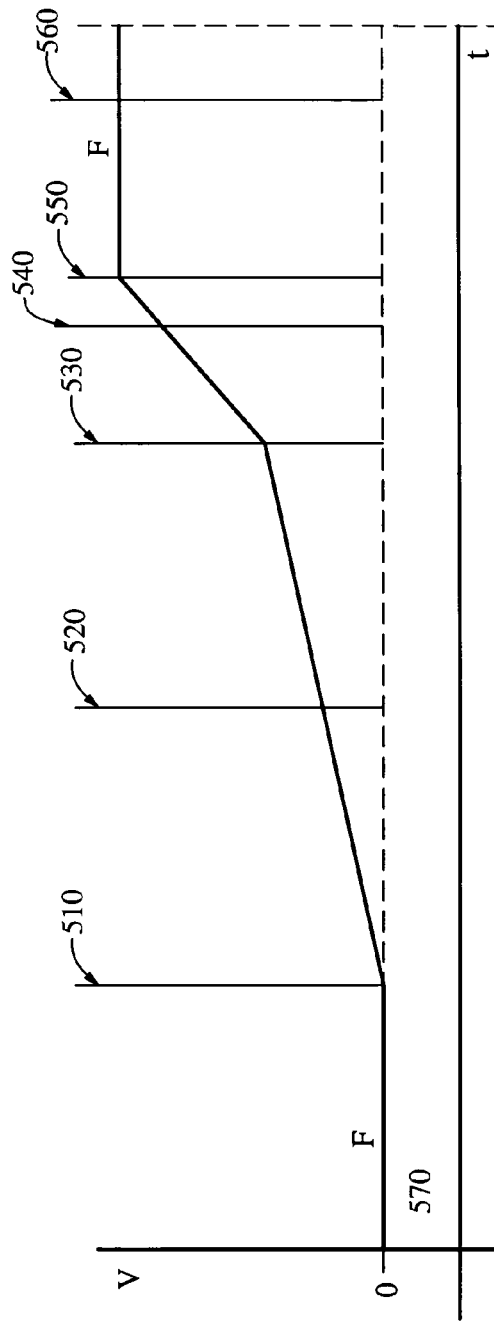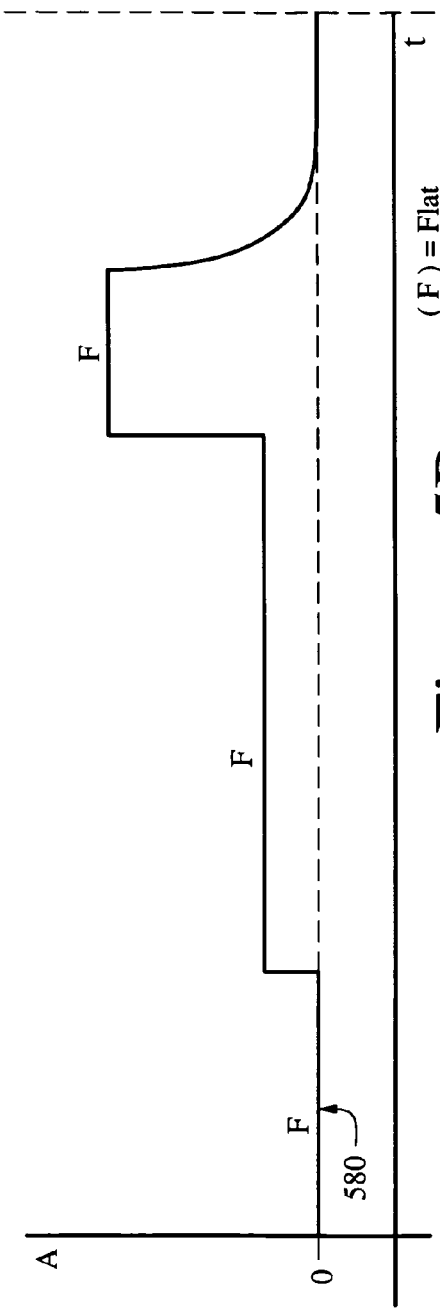
Figure 5A
Figure 5B
(F) = Flat

BATTERY CHARGER THAT EMPLOYS CURRENT SHARING TO SIMULTANEOUSLY POWER AN APPLICATION AND CHARGE A BATTERY

FIELD OF THE INVENTION

The invention relates to the charging of batteries in electrical devices. In particular, it relates to a method, an apparatus, and an article of manufacture for controlling the quantity of current allocated towards battery charging simultaneous with the supply of current to an application load.

BACKGROUND OF THE INVENTION

Many electrical devices are designed to be operable under battery power. Often, these electrical devices may be powered by an external power source or one or more batteries. Devices operable under battery power often provide circuitry for charging the batteries. This circuitry may be either internal to the device, integrated with an external power source circuit, or external to both the device and the external power source circuit.

The recent popularity of portable electronic devices such as portable computers, MP3 players, handheld video games, cellular telephones, and the like, has greatly increased the number of devices operable with rechargeable batteries. Consumers have become accustomed to the constant availability of the conveniences offered by these devices and may be reluctant to discontinue use in order to recharge the batteries. On the other hand, consumers prefer that the batteries always be fully charged such that the consumer may unplug the device at any time and have maximum runtime.

Accordingly, it is beneficial to have a method and a device to power an application load while charging a battery.

BRIEF DESCRIPTION OF THE DRAWINGS

FIG. 5a is a voltage waveform showing the voltage at the battery electrodes of an embodiment of the system and power supply configuration of FIG. 2 in relation to time according to aspects of the present invention;

FIG. 5b is a current waveform showing the charging current to the battery of an embodiment of the system and power supply configuration of FIG. 2 in relation to time according to aspects of the present invention.

DETAILED DESCRIPTION

Figure 1:
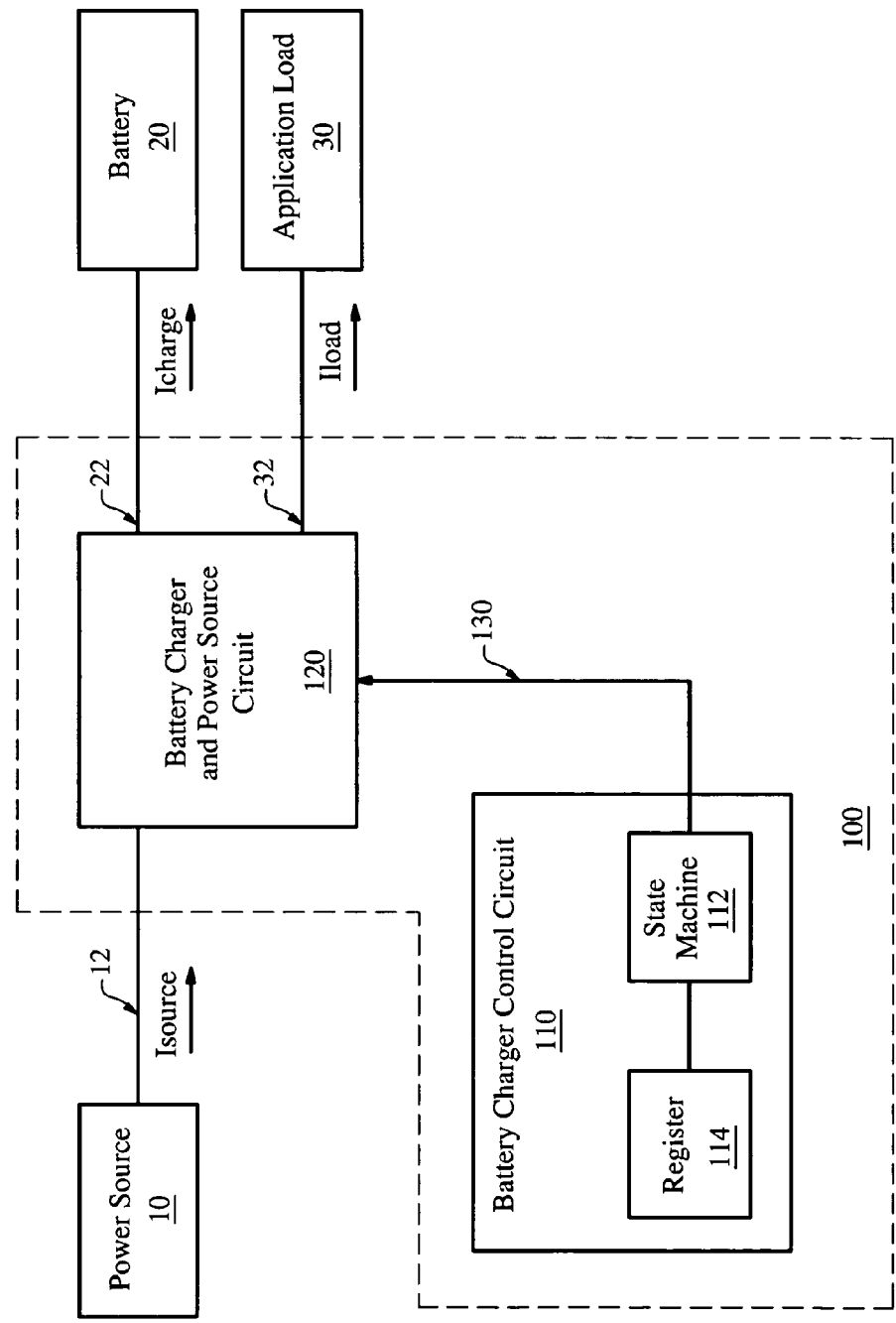
FIG. 1 is a block diagram showing a system and power supply configuration according to an embodiment of the present invention.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. The term "maximum" means at least either a maximum defined by programmed parameters, circuit configuration, safety considerations, and/or the like.

Briefly stated, the invention relates circuitry for controlling powering of a load and charging of a battery from a power source by a smart power supply. The smart power supply controls the maximum current for battery charging based in part upon variables such as the maximum rate of charge of the battery and maximum source current. Accordingly, the smart power supply is capable of providing the power requested by the load, and use the remaining power for battery charging.

FIG. 1 illustrates an embodiment of a power supply (100) and associated devices. The associated devices include power source 10, battery 20, and application load 30. Power supply 100 includes battery charger control circuit 110 and battery charger and power source circuit 120.

Battery charger control circuit 110 is configured to control the charging of battery 20 via state machine 112. State machine 112 is operable to at least partially control charging of battery 20 via control signal 130 and battery charger and power source circuit 120. In one embodiment, state machine 112 calculates control signal 130 based upon the value(s) of register 114. However, in other embodiments, state machine 112 may calculate the value of control signal 130 by a multitude of inputs and various means instead of or in addition to the values of register 114. In one embodiment, control signal 130 includes information about the maximum current available from the power source 10, the desired current with which to charge the battery 20, and/or the like.

Register 114 is operable to store operational parameters, default values, and other configuration data for state machine 112 to use in determining its output or controlling its operation. Battery charger control circuit 110 is connected to battery charger and power source circuit 120 via control signal 130 to control the charging of battery 20.

Battery charger and power source circuit 120 contains circuitry to connect application load 30 to battery 20 and/or power source 10 for obtaining operating power. These connections may be implemented by a variety of methods known in the art including, but not limited to, switches, transistors, relays, and the like. Likewise, these connections may be controlled by state machine 112. Battery charger and power source circuit 120 also contains circuitry to connect power source 10 to battery 20 for charging. This circuitry may consist of current regulators and/or voltage regulators configured to operate, in part, under the control of state machine 112 via control signal 130. In one embodiment, state machine 112 signals battery charger and power source circuit 120 to indicate an algorithm for supplying current to battery 20.

In response to the information received via control signal 130 and other factors, power source circuit 120 may increase or decrease the amount of current supplied to battery 20. For instance, battery charger and power source circuit 120 may adjust the amount of current supplied to battery 20 based, in part, on information about the maximum current available from the power source 10, the desired current with which to charge the battery 20, and/or the like. Battery charger and power source circuit 120 may utilize control signal 130, in part, to determine an appropriate charging current for battery 20. In this manner, power supply 100 is able to power application load 20 while maximizing charging current to battery 20, and accurately determine and calculate the value of control signal 130.

Figure 2:
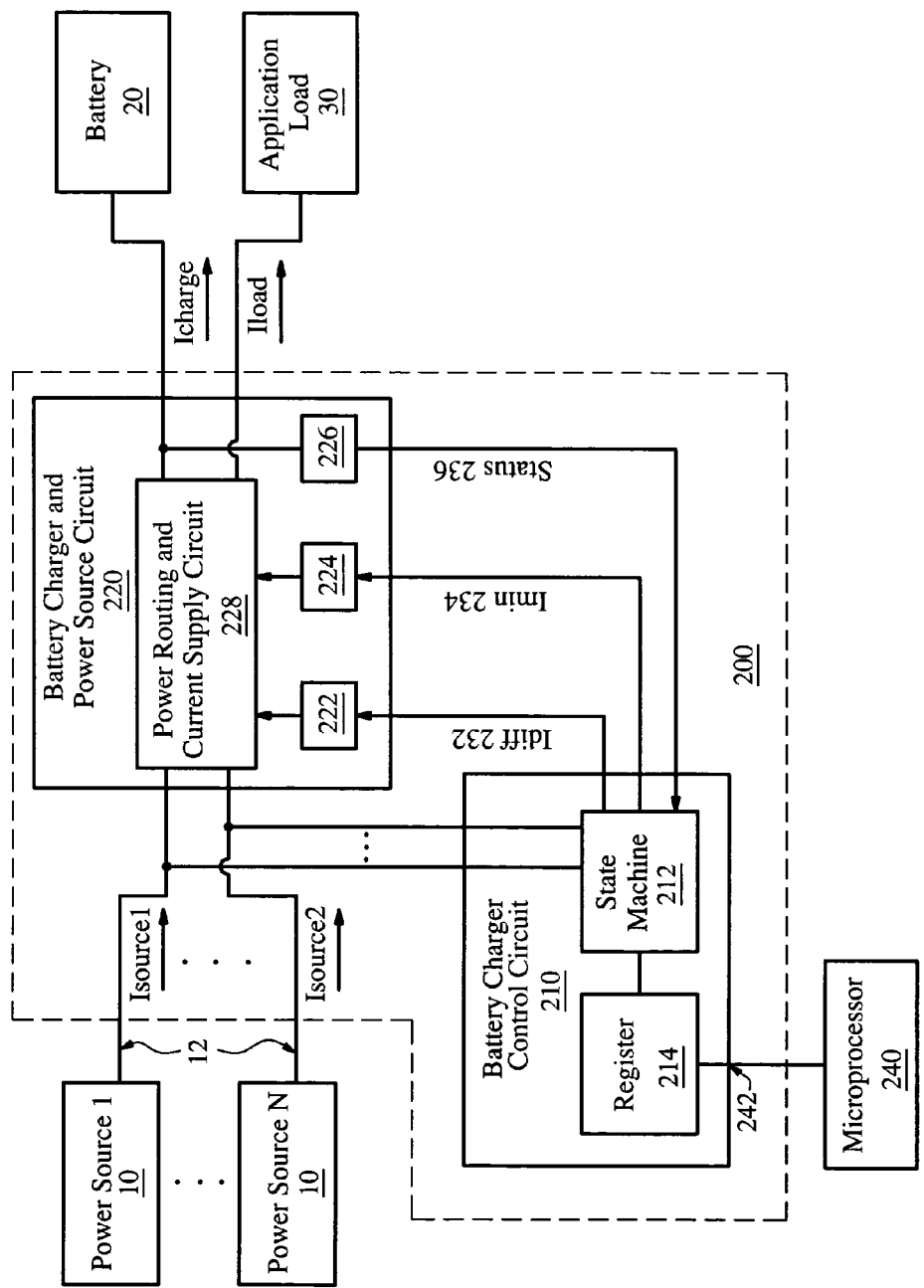
FIG. 2 is a block diagram showing an embodiment of the system and power supply configuration of FIG. 1 according to aspects of the present invention.

FIG. 2 illustrates an embodiment of power supply 200 and associated devices. FIG. 2 may be employed as an embodiment of power supply 100 of FIG. 1. Battery charger and power source circuit 220 may include power routing and current supply circuit 228, $I_{diff}$ interface 222, $I_{min}$ interface 224, and status signal generator 226.

Power source 10 may comprise a wall type AC adapter, a USB host, a firewire host, a 12 volt DC adapter (automobile type), and/or the like. Battery 20 may include a nickel-cadmium battery, a nickel-metal-hydride battery, a lithium-ion battery, a lithium-polymer battery, and/or the like. In an embodiment of the invention, battery 20 comprises a lithium-ion battery, and power sources 10 include a wall type AC adapter and a USB host.

Battery charger control circuit 210 includes register 214 and state machine 212. Register 214 may be a single register or multiple registers. Example parameters to be stored include an $I_{limit}$ variable to indicate the maximum current that power source 10 is able to deliver and an $I_{prog}$ variable to indicate the maximum current with which battery 20 may be charged. In one embodiment, for simplified digital design, these variables may be digitized with each binary count representing a magnitude of current. For example, in one embodiment, each increase in binary count indicates an additional 100 milliamps of current.

Register configuration interface 242 allows for updating and reading of registers 214 by microprocessor 240 or other control circuit. Although register configuration interface 242 is illustrated as connecting the microprocessor 240 to registers 214 in FIG. 2, in other embodiments, microprocessor 240 may be connected to the battery charger control circuit 210 in any manner which allows it to read or modify registers 214. For example, in one embodiment, microprocessor 240 may also be connected to registers 214 via state machine 212.

State machine 212 may be connected to: registers 214 for retrieval and updating of operational data; power source busses 12 for determining status of power source 10; and to battery charger and power source circuit 220 for controlling battery charging and determining battery and battery charging status. The embodiment illustrated in FIG. 2 includes registers 214 containing an $I_{limit}$ register for storing a value representing the maximum current that power supply 10 is configured to supply and an $I_{prog}$ register for storing a value representing the desired charging rate at which the battery 20 is to be charged.

In the embodiment as illustrated by FIG. 2, battery charger control circuit 210 is connected to battery charger and power source circuit 220 via control signal $I_{diff}$, signal $I_{min}$, and signal Status. Signal $I_{diff}$ informs battery charger and power source circuit 220 of the difference between the maximum current power source 10 is able to deliver ($I_{limit}$) and the desired current with which battery 20 may be charged ($I_{prog}$). Accordingly, $I_{diff}$ represents the maximum amount of current that application load 30 may consume before there is insufficient current to charge battery 20 at its desired charging rate. Signal $I_{min}$ notifies battery charger and power source circuit 220 of the minimum value of $I_{limit}$ and $I_{prog}$. This represents the maximum current with which to charge battery 20. Signal Status allows battery charger control circuit 220 to be aware of battery or battery status information. For example, this information may indicate the voltage at the battery 20 terminals, the charging state, the actual charging current for battery 20, and/or the like. Signals $I_{diff}$, $I_{min}$, and Status may each be single discrete signals lines, busses of multiple signal lines, multiplexed and demultiplexed on to one or more shared signal paths, and/or any other means of communicating a signal between the state machine 212 and battery charger and power source circuit 220.

In one embodiment, an asynchronous circuit, microcontroller, microprocessor and/or the like may perform the functions of state machine 212. Likewise, values stored in registers 214 may be have default values that may be reprogrammable or permanently configured. Default or permanently configured values may be configured by means such as pull-up and pull-downs, and the like.

Power routing and current supply circuit 228 is operable to connect application load 30 to one or more of battery 20 and/or power source 10 for obtaining operating power and/or regulating power to the application load 30. These connections may be implemented by a variety of methods known in the art including, but not limited to, switches, transistors, relays, and/or the like. For the system illustrated by FIG. 2, a three-way switch is particular well suited for supplying power to application load 30.

Power routing and current supply circuit 220 also includes circuitry to connect power source 10 to battery 20 for charging of battery 20. This circuitry may include current regulators, voltage regulators, current sensors, and voltage sensors, and/or the like, configured to operate under the control the $I_{diff}$ and $I_{min}$ signals for providing power to application load 30 and battery 20. In addition, status signal generator 226 is arranged to provide signal Status to battery charger control circuit 220. In one embodiment, battery charger control circuit 220 uses signal Status to determine if battery 20 is in trickle-charge or full-rate charge mode and status signal generator 226 includes an analog comparator configured to indicate if the voltage of battery 20 is above or below a trickle charging threshold level.

As is known in the art, typical lithium ion batteries are commonly charged in a multi-phase process which generally includes: a trickle charge phase, a full-rate constant current phase, and a constant voltage phase. During a trickle charge phase, a reduced amount of current is supplied to the battery to gradually increase the voltage of the battery cell. After reaching threshold voltage level $V_{tr}$, the battery is supplied with an increased amount of current to more quickly charge the battery during the full-rate constant current phase. Upon reaching voltage $V_{cv}$ the battery is charged in a constant voltage mode until the charge cycle for the battery ends.

According to one example, the trickle charge operation proceeds as follows. The threshold level is set to approximately 3 Volts for a typical 4.2 Volt lithium ion battery cell. When the battery voltage is above this threshold, battery 20 is charged at a "full-rate" charging current. However, if battery 20 is below this threshold, battery 20 is "trickle charged" until it reaches the threshold voltage. Likewise, Status signal generator 226 may include an analog-to-digital converter, and/or the like.

In one embodiment, power routing and current supply circuit 228 is operable to receive control signals $I_{diff}$ and $I_{min}$ via $I_{diff}$ interface 222 and $I_{min}$ interface 224 respectively. Interfaces 222 and 224 may consist of digital-to-analog converters operable to convert the digital outputs of state machine 212 to analog signals. In other embodiments, $I_{diff}$ interface 222 and $I_{min}$ interface 224 may reside in battery charger control circuit 210 or power routing and current supply circuit 228 may be configured to receive digital inputs.

Figure 3:
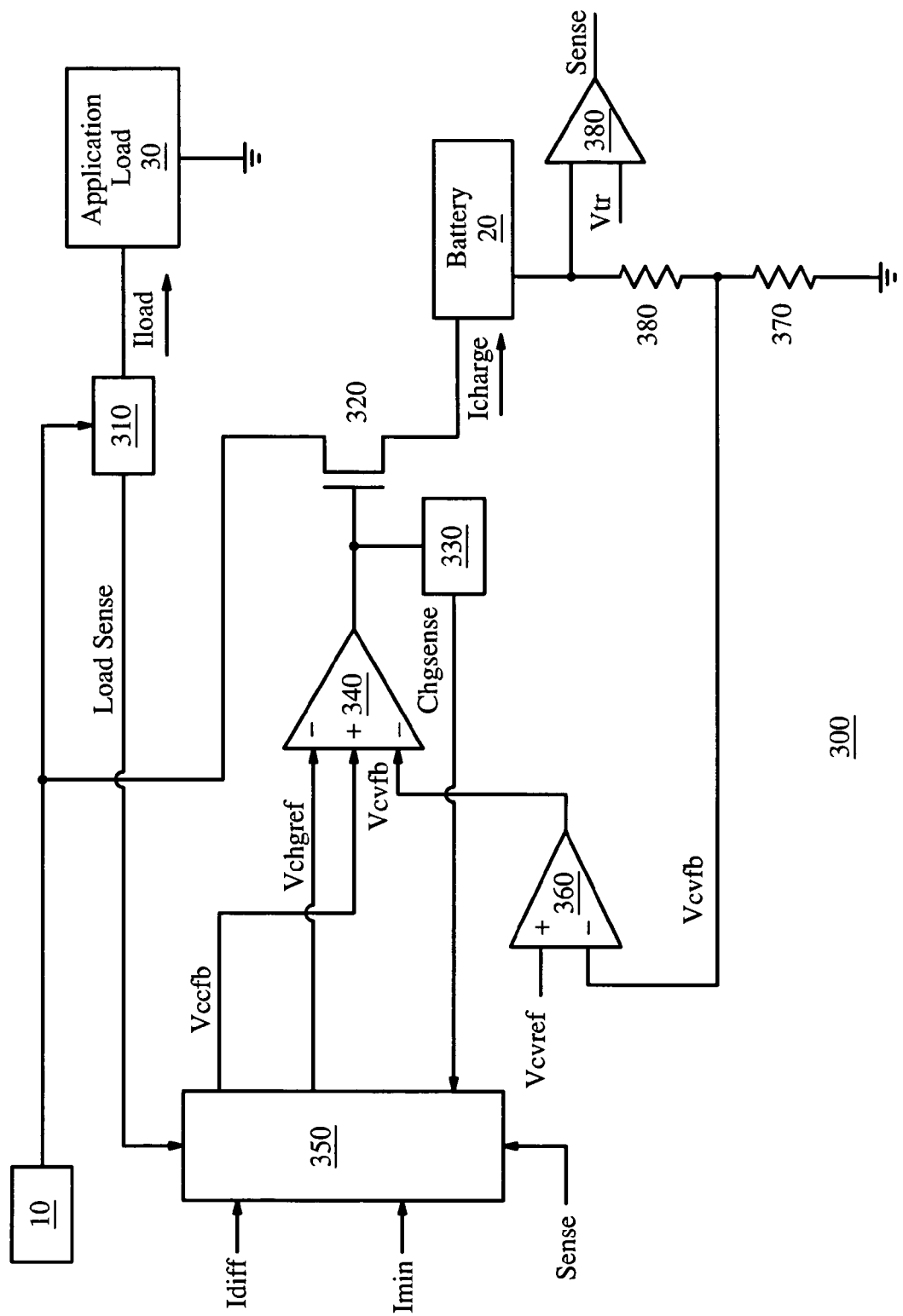
FIG. 3 is a block diagram showing an embodiment of the battery charger and power source circuit of FIG. 2 according to aspects of the present invention.

FIG. 3 is a circuit diagram illustrating an embodiment of battery charging circuit 300 of battery charger and power source circuit 220 of FIG. 2 as configured to supply current to battery 20 under the control of the $I_{diff}$ and $I_{min}$ and Status signals. In this embodiment, application load 30 draws load current $I_{load}$. Load current sense circuit 310 outputs a proportional signal Loadsense. Battery charging current $I_{charge}$ is supplied to battery 20 by pass transistor 320. Charge current sense circuit 330 outputs a proportional signal Chgsense. Signals Loadsense and Chgsense may be either current signals, voltage signals, and/or the like.

Charge feedback amp 340 operates an error amp to control current Icharge based on the difference between lower of the voltages $V_{chgref}$ and $V_{cvfb}$ and charging reference voltage $V_{ccfb}$. Charge feedback amp 340 increases or decreases the power to battery 20 via pass transistor 320 and charging current sense circuit 330. During both trickle mode and full-rate charge mode, charger control 350 controls the charging current to battery 20 based upon feedback voltage $V_{ccfb}$. Charger control 350 receives signals Loadsense and Chgsense as well as digital inputs $I_{diff}$, $I_{min}$, and Sense to control charging of battery 20 via output $V_{ccfb}$. Charger control 350 calculates output voltage $V_{ccfb}$ such that, in one embodiment, during CC full-rate mode, current Icharge is regulated as follows. If Iload-Idiff is less or equal to zero, current Icharge is regulated to Imin. If Iload-Idiff is greater than zero, current Icharge is regulated to Imin-(Iload-Idiff). In one embodiment, charger control circuit 350 includes embodiments of $I_{diff}$ interface 222, $I_{min}$ interface 224 of FIG. 2.

The voltage of battery 20 is monitored by constant voltage amp 360 via resistor divider network 370, 380. When the voltage of battery 20 increases, the constant voltage feedback voltage $V_{cvfb}$ increases relative to constant voltage reference voltage $V_{cvref}$. When the voltage of battery 20 reaches constant voltage phase voltage threshold $V_{cv}$, the output of constant voltage feedback amp 360 falls below Vchgref. Accordingly, charge feedback amp 340 begins supplying power to battery 20 via pass transistor 320 and charge current sense circuit 330 based on the output of charge feedback amp 340. Further, signal Sense is provided to inform state machine 212 of FIG. 2 of the battery charging status.

Figure 4:
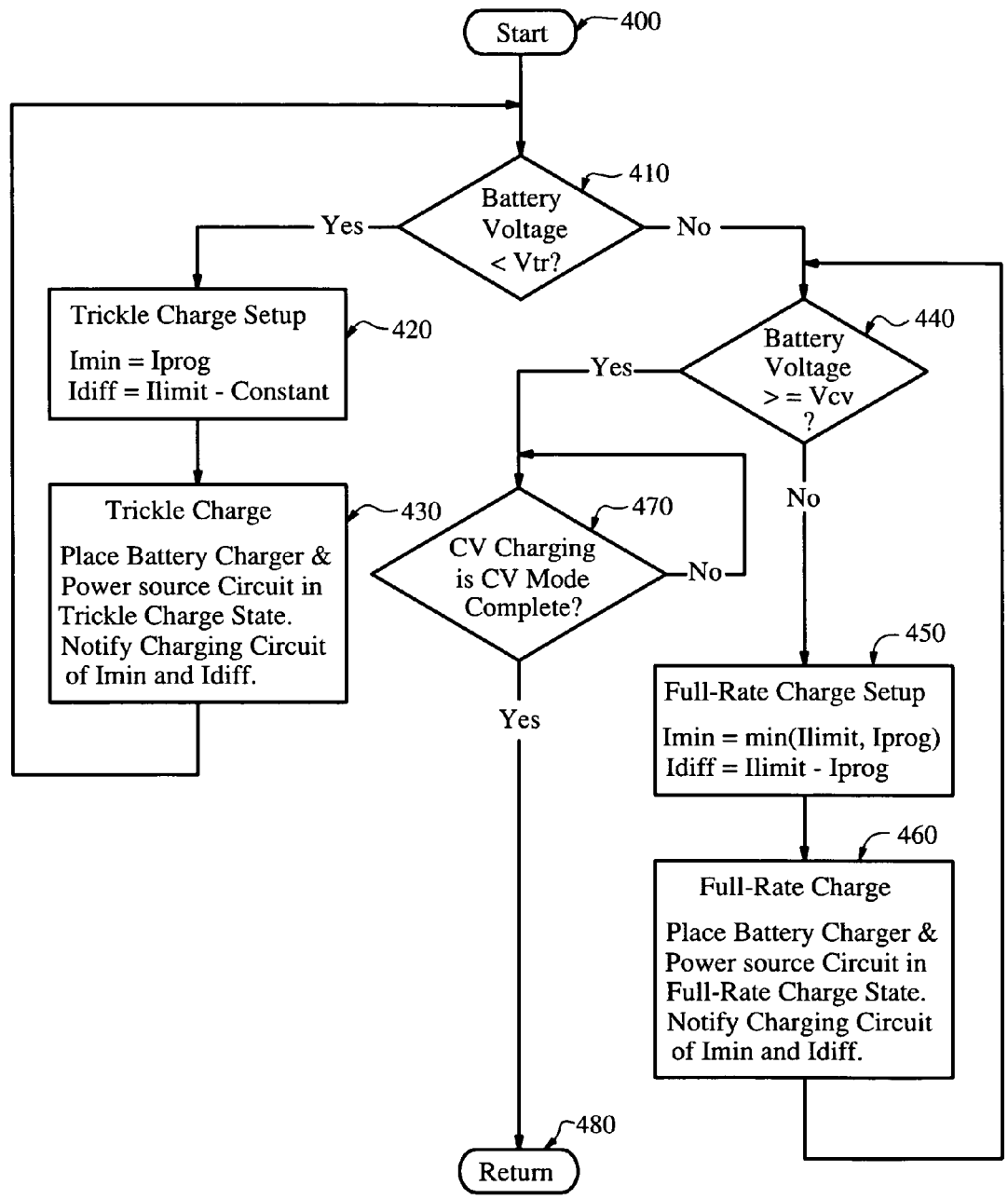
FIG. 4 is a flow chart showing a charging algorithm according to an embodiment of the system and power supply configuration of FIG. 2 according to aspects of the present invention.

FIG. 4 is a flow chart for the operation and control provided by battery charger control circuit 210. After start block 400, the process proceeds to decision block 410, where the voltage of battery 20 is measured and battery charger control circuit 210 determines, as discussed above, whether battery 20 is to be trickle charged.

If the battery 20 voltage is below voltage threshold $V_{tr}$, the process proceeds to block 420, where the $I_{min}$ value is set to the value of $I_{prog}$ to represent the maximum $I_{charge}$ for battery 20. Further, at block 420, $I_{diff}$ is set to $I_{limit}$ minus a constant to represent the maximum $I_{load}$ before there is insufficient current to supply $I_{charge}$ at the preferred rate. Because during trickle charging $I_{charge}$ may be quite low, a value of 100 milliamps is used as the constant in one embodiment. In one embodiment, neither $I_{min}$ nor $I_{diff}$ are negative; if the discussed calculations produce a negative result, the value is set to zero. The process then moves to block 430.

At block 430, battery charger 220 is placed in trickle charging mode and is informed of the value of $I_{min}$ and $I_{diff}$. Battery charger 220 then charges battery 20 at a fraction of the $I_{min}$ value if current $I_{load}$ less than current $I_{diff}$. $\frac{1}{10}^{th}$ of $I_{min}$ is a suitable fraction for current $I_{charge}$; however a fraction other than $\frac{1}{10}$ may be used within the scope and spirit of the invention. If $I_{load}$ is greater than $I_{diff}$, charging current $I_{charge}$ is reduced, as discussed below, to give priority to application load 30.

If at decision block 410, the voltage of battery 20 is above voltage threshold $V_{tr}$, the process proceeds to decision block 440 to determine if the voltage of battery 20 has reached voltage mode threshold $V_{cv}$. Battery 20 is charged in constant voltage mode if its voltage reaches $V_{cv}$, which, for a common lithium ion battery cell, is typically set to approximately 4.2 volts. If the voltage of battery 20 is above $V_{cv}$, the process proceeds to decision block 470, for constant voltage charging as discussed below. After constant voltage charging is complete, the process proceeds to return block 480 where other processing is resumed. Accordingly, if the voltage of battery 20 is above $V_{tr}$ but below $V_{cv}$ then the process goes to block 450 for the setup of a full-rate charge. At block 450, the $I_{min}$ value is set to the smaller of the $I_{limit}$ or $I_{prog}$ value, and identifies the desired charging rate of battery 20 if sufficient current is available. The $I_{diff}$ value is also set to $I_{limit}$ minus $I_{prog}$ to calculate the maximum $I_{load}$ current that may be supplied prior to reduction of $I_{charge}$. The process then advances to block 460, where battery charger 220 is placed in full-rate mode and notified of the calculated values of $I_{diff}$ and $I_{min}$.

In one embodiment, battery charger and power source circuit 220 is operable to charge battery 20 based on signals $I_{min}$ and $I_{diff}$ as follows. Battery charger 220 charges battery 20 with $I_{charge}$ current which is equal to $I_{min}$ current if application load 30 draws less than $I_{diff}$ current. If application load 30 draws more than $I_{diff}$ current, then $I_{charge}$ is reduced to give priority to application load 30. In one embodiment, $I_{charge}$ is reduced by the amount that the application load 30 draws that is in excess of $I_{diff}$. Charging continues until the voltage of battery 20 reaches $V_{cv}$ as determined by block 440 upon which time the process proceeds to block 470.

FIG. 5a is a waveform showing the voltage at battery 20 while being charged by an embodiment of the invention. Prior to start time 510, no current or voltage is supplied to battery 20. At start time 510, voltage waveform 570 is at zero as battery 20 is fully discharged. Because the battery voltage is below $V_{tr}$, battery 20 is charged in trickle charge mode during time trickle charge period 520. At full-rate start time 530 the battery voltage has reached $V_{tr}$. Accordingly, battery 20 is charged in a current limited full-rate mode during full-rate period 540. At constant voltage start time 550, battery 20 is nearly charged to capacity and it begins self regulating its charging current $I_{charge}$. Because $I_{charge}$ asymptotically approaches zero due to battery 20 self regulation, current limitations based upon control signal 130 output of state machine 112 have limited importance during constant voltage charging period 560. In one embodiment, current limitations based upon control signal 130 employed during the constant voltage phase, and in another embodiment, they are not employed during the constant voltage phase.

FIG. 5b is a waveform showing the current $I_{charge}$ into battery 20 while being charged by an embodiment of the invention. Prior to start time 510, no current or voltage is supplied to battery 20; thus $I_{charge}$ is at zero. At start time 510, charging is initiated. Because the voltage of battery 20 is less than $V_{tr}$ during trickle charge time 520, $I_{charge}$ is limited to the trickle charging current during time trickle charge period 520.

At full-rate start time 530 the voltage of battery 20 has reached $V_{fr}$. Accordingly, battery 20 is charged in a current limited full-rate mode during full-rate period 540. Current $I_{charge}$ supplied during full-rate period 540 is generally greater than the current supplied during trickle charge period 520. At constant voltage start time 550, battery 20 is nearly charged to capacity and any current limitations of the full-rate mode may be removed for constant voltage charging period 560. During this time, the battery charging current asymptotically goes to zero.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A method of charging a battery and powering a load, comprising:

setting a first variable to represent a maximum source current available from a power source;

setting a second variable to represent a maximum rate of charge for the battery;

employing a state machine to calculate a first battery charging control signal that indicates a first current value that represents a maximum charging current for the battery based upon the first variable and the second variable;

employing the state machine to calculate a second battery charging control signal that indicates a second current value that represents a threshold load current based upon the first variable and the second variable;

supplying a current to the load via a power supply circuit; and supplying an actual charging current to the battery by providing the first battery charging control signal and the second battery charging control signal to the power supply circuit, wherein the actual charging current is based, at least in part, on a sensed magnitude of the load current such that if the load current is less than the threshold load current, the actual charging current is not greater than the maximum charging current; and such that if the load current is greater than the threshold load current, the actual charging current is not greater than the difference between the maximum source current and the load current.

2. The method of claim 1, further comprising:

determining if the battery voltage is above or below a fullrate charging threshold; and if the battery voltage is below the fullrate charging threshold, supplying an actual charging current to the battery which is substantially less than the maximum charging current.

3. The method of claim 1, wherein setting the first and second variables is accomplished by digitally storing the first variable and the second variable in flip-flops; and wherein calculating the maximum charging current and the threshold load current is accomplished by digital calculations.

4. The method of claim 2, wherein calculating the maximum charging current includes:

calculating the maximum charging current by taking the minimum value of: the maximum rate of charge and the maximum source current; and wherein calculating the threshold load current includes:

if the battery voltage is above the fullrate charging threshold, calculating the threshold load current by subtracting the maximum rate of charge from the maximum source current; and if the battery voltage is below the fullrate charging threshold, calculating the threshold load current by subtracting a constant from the maximum source current.

5. The method of claim 1, further comprising:

determining if the battery voltage is above a fullrate charging threshold;

determining if the battery voltage is above a constant voltage charging threshold, wherein the constant voltage charging threshold is above the fullrate charging threshold; and if the battery voltage is below the fullrate charging threshold, calculating the maximum charging current by taking the minimum value of the maximum rate of charge and the maximum source current;

calculating the threshold load current by subtracting a constant from the maximum source current; and supplying an actual charging current to the battery which is substantially less than the maximum charging current; and if the battery voltage is above the fullrate charging threshold but below the constant voltage charging threshold, calculating the maximum charging current by taking the minimum value of the maximum rate of charge and the maximum source current; and calculating the threshold load current by subtracting the maximum rate of charge from the maximum source current; and supplying an actual charging current to the battery such that, during a current regulation, if the load current is less than the threshold load current, the actual charging current is the maximum charging current; and such that if the toad current is greater than the threshold load current, the actual charging current is the difference between the maximum source current and the load current.

6. A power supply for a supplying electrical power to a load, comprising:

a power supply circuit that is connectable to a power source, a battery, and a load circuit, wherein the power supply circuit is operable to charge the battery during a charging cycle and to provide a toad current to the load circuit; the charging cycle includes current regulation;

the power supply circuit is further operable to receive one or more battery charging control signals; and to set one or more operational parameters utilized in the charging of the battery based, in part, on the battery charging control signals such that the current regulation is based, in part, on the battery charging control signals; and a battery charger control circuit operable to provide the one or more battery charging control signals, wherein the battery charger control circuit includes:

one or more registers operable to store one or more battery charging variables; and a state machine configured to read at least one of the one or more registers and to calculate the one or more battery charging control signals based, in part, one or more battery charging variables and based, in part, on a sensed magnitude of the load current, wherein the one or more registers include:

a first register that is operable to store a first variable of the one or more battery charging variables, wherein the first variable represents an available source current from the power source; and a second register that is operable to store a second variable of the one or more battery charging variables, wherein the second variable represents a maximum rate of charge for the battery; and wherein the one or more battery charging control signals include:

a first battery charging control signal that indicates first current value that represents a maximum desired charging current for the battery, wherein the state machine is operable to provide the first battery charging control signal based upon the first variable and the second variable; and a second battery charging control signal that indicates a second current value that represents a maximum load current to be supplied before the power supply circuit reduces an actual charging current from the maximum desired charging current, wherein the state machine is operable to provide the second battery charging control signal based upon the first variable and the second variable.

7. The power supply of claim 6, wherein the current regulation is controlled, based in part, on a magnitude of current that is supplied to the battery and at least one of the one or more battery charging control signals.

8. The power supply of claim 6, wherein the state machine is configured to receive an input representing a state of the battery.

9. The power supply of claim 6, wherein the state machine is configured to receive one or more inputs representing a state of one or more power sources.

10. The power supply of claim 6, wherein the battery charger control circuit further includes a microprocessor interface configured to receive a signal that enables an update of a battery charging variable.

11. A power supply for a supplying electrical power to a load, comprising:

a power supply circuit that is connectable to a power source, a battery, and a load circuit, wherein the power supply circuit is operable to charge the battery during a charging cycle and to provide a load current to the load circuit; the charging cycle includes current regulation; the power supply circuit is further operable to receive one or more battery charging control signals; and to set one or more operational parameters utilized in the charging of the battery based, in part, on the battery charging control signals such that the current regulation is based, in part, on the battery charging control signals; and a battery charger control circuit operable to provide the one or more battery charging control signals, wherein the battery charger control circuit includes:

one or more registers operable to store one or more battery charging variables; and a state machine configured to read at least one of the one or more registers and to calculate the one or more battery charging control signals based, in part, on the one or more battery charging variables and based, in part, on a sensed magnitude of the load current, wherein the one or more registers include:

a first register that is operable to store a first variable of the one or more battery charging variables, wherein the first variable represents an available source current from the power source; and a second register that is operable to store a second variable of the one or more battery charging variables, wherein the second variable represents a maximum rate of charge for the battery; and wherein the one or more battery charging control signals include:

a first battery charging control signal that indicates first current value that represents a maximum desired charging current for the battery, wherein the state machine is operable to provide the first battery charging control signal such that the first battery charging control signal is the minimum of the first variable and the second variable; and a second battery charging control signal that indicates a second current value that represents a maximum load current to be supplied before the power supply circuit reduces an actual charging current from the maximum desired charging current, wherein the state machine is operable to provide the second battery charging control signal such that the second battery charging control signal is the difference of the first variable and the second variable; and wherein the power supply circuit is operable to supply & load current and an actual charging current to the battery, wherein the load draws the load current from the power supply and the actual charging current is regulated as follows during the current regulation:

if the load current is less than the second current value, then the actual charging current is regulated such that it is the first current value; otherwise the actual charging current is regulated such that it is equal to the difference between the first current value and the toad current.

12. A processor-readable medium having processor executable code stored therein, which when executed by one or more processors, enables actions, comprising:

setting a first variable to represent an available source current from a power source;

setting a second variable to represent a maximum rate of charge for a battery;

calculating a first battery charging control signal that indicates a first current value that represents a maximum charging current for the battery based upon the first variable and the second variable;

calculating a second battery charging control signal that indicates a second current value that represents a threshold load current based upon the first variable and the second variable;

supplying a current to the load via a power supply circuit; and supplying an actual charging current to the battery by providing the first battery charging control signal and the second battery charging control signal to the power supply circuit, wherein the actual charging current is based, at least in part, on a sensed magnitude of the load current, such that if the load current is less than the threshold load current, the actual charging current is not greater than the maximum charging current; and such that if the load current is greater than the threshold load current, the actual charging current is not greater than the difference between the maximum source current and the load current.

13. The processor-readable medium of claim 12, which when executed by one or more processors, enables further actions, comprising:

determining if the battery voltage is above or below a fullrate charging threshold; and if the battery voltage is below the fullrate charging threshold, supplying an actual charging current to the battery which is substantially less than the maximum charging current.

14. The processor-readable medium of claim 12, wherein setting the first and second variables is accomplished by digitally storing the first variable and the second variable in flip-flops; and
    wherein calculating the maximum charging current and the threshold load current is accomplished by digital calculations.

15. The processor-readable medium of claim 13, wherein calculating the maximum charging current includes:
    if the battery voltage is above the fullrate charging threshold, calculating the maximum charging current by taking the minimum value of the maximum rate of charge and the maximum source current; and
    if the battery voltage is below the fullrate charging threshold, calculating the maximum charging current by taking the minimum value of the maximum rate of charge and the maximum source current; and
  wherein calculating the threshold load current includes:
    if the battery voltage is above the fullrate charging threshold, calculating the threshold load current by subtracting the maximum rate of charge from the maximum source current; and
    if the battery voltage is below the fullrate charging threshold, calculating the threshold load current by subtracting a constant from the maximum source current.

16. The processor-readable medium of claim 12, wherein setting the first variable includes setting the first variable in a first register, and wherein setting the second variable includes setting the second variable in a second register.

17. The processor-readable medium of claim 12, wherein calculating the first battery charging control signal is carried out with a state machine, and wherein calculating the second battery charging control signal is carried out with the state machine.

18. The processor-readable medium of claim 12, wherein the enabled actions further include setting one or more operational parameters utilized in the charging of the battery based, in part, on the first battery control signal and the second battery control signal such that current regulation is based, in part, on first battery control signal and the second battery control signal.

* * * * *

UNITED STATES PATENT AND TRADEMARK OFFICE
CERTIFICATE OF CORRECTION

PATENT NO. : 7,535,195 B1
APPLICATION NO. : 11/212171
DATED : May 19, 2009
INVENTOR(S) : Neal Lane Horovitz et al.

Page 1 of 1

It is certified that error appears in the above-identified patent and that said Letters Patent is hereby corrected as shown below:

In column 1, line 47, delete "invention." and insert -- invention; --, therefor.

In column 5, line 22, delete "Icharge" and insert -- $I_{charge}$ --, therefor.

In column 5, line 33, delete "Icharge" and insert -- $I_{charge}$ --, therefor.

In column 5, line 34, delete "Iload-Idiff" and insert -- $I_{load}-I_{diff}$ --, therefor.

In column 5, line 34, delete "Icharge" and insert -- $I_{charge}$ --, therefor.

In column 5, line 35, delete "Imin." and insert -- $I_{min}$. --, therefor.

In column 5, line 35, delete "Iload-Idiff" and insert -- $I_{load}-I_{diff}$ --, therefor.

In column 5, line 36, delete "Icharge." and insert -- $I_{charge}$. --, therefor.

In column 5, line 36, delete "Imin-(Iload-Idiff)" and insert -- $I_{min}-(I_{load}-I_{diff})$ --, therefor.

In column 5, line 45, delete "Vchgref." and insert -- $V_{chgref}$. --, therefor.

In column 8, line 35, in claim 5, delete "toad" and insert -- load --, therefor.

In column 8, line 44, in claim 6, delete "toad" and insert -- load --, therefor.

In column 9, line 22, in claim 7, after "of" insert -- a --.

In column 10, line 29, in claim 11, delete "toad" and insert -- load --, therefor.

Signed and Sealed this

Fifth Day of January, 2010

David J. Kappos
*Director of the United States Patent and Trademark Office*